(12) United States Patent
Yamakawa et al.

(10) Patent No.: US 7,997,152 B2
(45) Date of Patent: Aug. 16, 2011

(54) MAGNETOSTRICTIVE TORQUE SENSOR AND TORQUE DETECTION METHOD

(75) Inventors: Kazuhiro Yamakawa, Kounosu (JP); Tetsuo Kanda, Yokohama (JP)

(73) Assignee: Azuma Shokai Co., Ltd., Tokyo (JP)

( * ) Notice: Subject to any disclaimer, the term of this patent is extended or adjusted under 35 U.S.C. 154(b) by 263 days.

(21) Appl. No.: 12/448,247

(22) PCT Filed: Dec. 19, 2007

(86) PCT No.: PCT/JP2007/001431
§ 371 (c)(1),
(2), (4) Date: Jun. 15, 2009

(87) PCT Pub. No.: WO2008/081573
PCT Pub. Date: Jul. 10, 2008

(65) Prior Publication Data
US 2010/0101336 A1    Apr. 29, 2010

(30) Foreign Application Priority Data

Jan. 2, 2007 (JP) .................. 2007-000007
Jan. 30, 2007 (JP) .................. 2007-019347
May 10, 2007 (JP) .................. 2007-125457
Jun. 24, 2007 (JP) .................. 2007-165721

(51) Int. Cl.
*G01L 3/02* (2006.01)
(52) U.S. Cl. ............... 73/862.333; 73/862.331

(58) Field of Classification Search ...... 73/862.331–333
See application file for complete search history.

(56) References Cited

U.S. PATENT DOCUMENTS

| | | | |
|---|---|---|---|
| 4,709,209 A * | 11/1987 | Murakami et al. | 178/18.07 |
| 5,280,729 A * | 1/1994 | Aoki et al. | 73/862.333 |
| 5,526,704 A * | 6/1996 | Hoshina et al. | 73/862.335 |
| 5,562,004 A * | 10/1996 | Kaise et al. | 73/862.336 |
| 6,330,833 B1 * | 12/2001 | Opie et al. | 73/862.333 |
| 7,389,702 B2 * | 6/2008 | Ouyang et al. | 73/862.331 |
| 7,752,922 B2 * | 7/2010 | Shimizu | 73/862.333 |

FOREIGN PATENT DOCUMENTS

| | | |
|---|---|---|
| JP | U-1-78432 | 5/1989 |
| JP | U-2-81434 | 6/1990 |
| JP | A-6-221940 | 8/1994 |
| JP | A-6-273247 | 9/1994 |
| JP | A-7-83769 | 3/1995 |
| JP | A-11-37863 | 2/1999 |
| JP | A-2001-133337 | 5/2001 |
| JP | A-2002-148003 | 5/2002 |
| JP | A-2005-208008 | 8/2005 |

* cited by examiner

*Primary Examiner* — Max Noori
(74) *Attorney, Agent, or Firm* — Oliff & Berridge, PLC (57) ABSTRACT

A magnetostrictive torque sensor that detects a torque of a rotating shaft and/or a stationary shaft by using a magnetostriction inverse effect that occurs on a shaft surface, the magnetostrictive torque sensor includes a first detection coil, a second detection coil, a first oscillation circuit, a second oscillation circuit, a first direction magnetic permeability detector, a second direction magnetic permeability detector, and a torque detector.

19 Claims, 10 Drawing Sheets

PHASE SHIFT OF 4TH WAVE

MAGNETOSTRICTIVE TORQUE SENSOR AND TORQUE DETECTION METHOD

CROSS-REFERENCE TO RELATED APPLICATIONS

This application is the U.S. National Phase of PCT/JP2007/001431, filed Dec. 19, 2007, which claims priority from Japanese Patent Application No. 2007-000007, filed Jan. 2, 2007, Japanese Patent Application No. 2007-019347, filed Jan. 30, 2007, Japanese Patent Application No. 2007-125457, filed May 10, 2007, and Japanese Patent Application No. 2007-165721, filed Jun. 24, 2007, the entire disclosure of which is incorporated herein by reference hereto.

BACKGROUND

The present disclosure relates to a magnetostrictive torque sensor and a torque detection method.

There exists a magnetostrictive torque sensor that detects a torque of a rotating shaft or a stationary shaft by using a magnetostriction inverse effect that occurs on surfaces of the shafts. The magnetostriction inverse effect is a magnetic deformation phenomenon in which a deformation occurs on shaft surfaces in a tension direction (a plus 45-degree-angle direction, for example) and a compression direction (a minus 45-degree-angle direction, for example) when a torque affects a rotating shaft or a stationary shaft, with a resultant magnetic permeability increasing in the tension direction and decreasing in the compression direction. The magnetostrictive torque sensor includes a first detection coil that is disposed for detecting a magnetic permeability change in a first direction (the plus 45-degree-angle direction, for example) on the shaft surface; and a second detection coil disposed for detecting a magnetic permeability change in a second direction (the minus 45-degree-angle direction, for example) on the shaft surface.

There exist various types of magnetic torque sensors according to different detection coils. There are proposed various methods using a pair of U-shaped cores around which detection coils are wound (see Japanese Published Unexamined Patent Application No. JP-A-2001-133337, for example), a pair of detection coils that are formed to be a figure eight (see Japanese Published Unexamined Patent Application No. JP-A-6-221940, for example), a pair of detection coils that are formed to be a wave shape (see Japanese Published Unexamined Patent Application No. JP-A-6-273247, for example), and a pair of detection coils that are formed to be a hollow tube shape. In addition, the method using the hollow-tubular-shaped detection coils includes magnetic anisotropic portions that are formed to be a slit, groove, thin film, etc. on a shaft surface; and no magnetic anisotropic portion on a shaft surface (see Japanese Published Unexamined Patent Application Nos. JP-A-7-83769, JP-A-11-37863 and JP-A-2005-208008, for example).

SUMMARY

However, the above-mentioned conventional magnetostrictive torque sensors are subject to noises and have a limited detection accuracy because a bridge circuit or the like is used in order to detect a slight differential voltage that occurs between the detection coils. An amplifier circuit is used in order to amplify the differential voltage.

In addition, the magnetostrictive torque sensors disclosed in Japanese Published Unexamined Patent Application Nos. JP-A-7-83769 and JP-A-11-37863 are used in a torque-assist system of a motorized bicycle, for example. However, the conventional magnetostrictive torque sensors should include a plus/minus 45-degree stripe (magnetic anisotropic portion) that is formed to be a groove, slit, or thin film on the shaft surface so as to secure a required detection accuracy. Accordingly, the conventional magnetostrictive torque sensors cannot be used with rotating shafts and stationary shafts on which the stripe cannot be formed.

The disclosure according to an exemplary aspect provides a magnetostrictive torque sensor that detects a torque of a rotating shaft and/or a stationary shaft by using a magnetostriction inverse effect that occurs on a shaft surface. The magnetostrictive torque sensor includes a first detection coil that is disposed so as to detect a magnetic permeability change in a first direction on the shaft surface, the first detection coil detecting the magnetic permeability change in the first direction as an inductance change of the first detection coil; a second detection coil that is disposed so as to detect a magnetic permeability change in a second direction on the shaft surface, the second detection coil detecting the magnetic permeability change in the second direction as an inductance change of the second detection coil; a first oscillation circuit that oscillates autonomously at a predetermined reference frequency and causes phase shifts in oscillating waves according to the inductance change of the first detection coil; a second oscillation circuit that oscillates autonomously at a predetermined reference frequency and causes phase shifts in oscillating waves according to the inductance change of the second detection coil; a first direction magnetic permeability detector that performs an oscillating wave counting processing and detects the magnetic permeability change in the first direction based on a time required for the oscillating wave counting processing that counts a plurality of oscillating waves that are output from the first oscillation circuit and determines whether a counted number reaches a predetermined number N; a second direction magnetic permeability detector that performs an oscillating wave counting processing and detects the magnetic permeability change in the second direction based on a time required for the oscillating wave counting processing that counts a plurality of oscillating waves that are output from the second oscillation circuit and determines whether a counted number reaches a predetermined number N; and a torque detector that detects the torque of the rotating shaft and/or the stationary shaft based on a difference between the magnetic permeability of the first and second directions.

A torque detection accuracy can be improved with the magnetostrictive torque sensor. Magnetic permeability changes on the shaft surface clearly appear as phase shifts in oscillating waves that are output from the first and second oscillation circuits configured as described above, and the phase shifts in the oscillating waves are accumulated equal to a number of the oscillating waves. In other words, the magnetic permeability changes in the first and second directions can be detected with higher accuracy. A torque of the rotating shaft or stationary shaft can also be detected with higher accuracy from the difference between these permeability changes. In addition, an oscillating wave counting processing is performed in order to count the number of oscillating waves that are output from the oscillation circuits and determine whether the counted number reaches a predetermined number N. Then, the accumulated phase shifts of the oscillating waves (magnetic permeability changes) are measured based on a time required for the oscillating wave counting processing. Accordingly, phase shift components of the oscillating waves can be measured with higher accuracy by using an inexpensive digital circuit. A resolution thereof is determined according to a time measuring counter speed and without depending on reference frequencies of the oscillation circuits. Accordingly, a stress detection can be performed with higher resolution while the reference frequencies of the oscillation circuits are optimized according to an object to be detected.

In another exemplary aspect, the first and second detection coils form closed magnetic paths between the first and second detection coils and the shaft surface in order to limit detection regions and/or detection directions on the shaft surface.

A torque detection accuracy can be improved with the magnetostrictive torque sensor because detection regions and directions are limited on the shaft surface. Error components that may be included in phase shifts of oscillating waves may be accumulated because phase shifts of oscillating waves corresponding to a torque are detected after being accumulated equal to a number of the oscillating waves by using the magnetostrictive torque sensor of the present disclosure. Nevertheless, a SN ratio can be increased because detection regions and directions are limited on the shaft surface. A detection accuracy can also be improved because such error components can be reduced. Furthermore, there is no need to form stripes on the shaft surface by a groove, slit, thin film and so on because detection directions can be limited at a side of the detection coil. Accordingly, a torque detection of the present disclosure can be applied even to a rotating shaft and a stationary shaft on which such stripes cannot be formed.

In another exemplary aspect, the first and second detection coils are formed using a high magnetic-permeability material. The first and second detection coils include a core, the closed magnetic paths being between the core and the shaft surface; and a coil that is wound around the core.

With the magnetostrictive torque sensor, magnetic permeability changes on the shaft surface can be detected with higher accuracy by increasing magnetic flux densities that occurs in the closed magnetic paths.

In another exemplary aspect, the first oscillation circuit includes a plurality of first detection coils that are connected in series or parallel, whereas the second oscillation circuit includes a plurality of second detection coils that are connected in series or parallel.

With the magnetostrictive torque sensor, temperature and material quality variations on the shaft surface and gap fluctuations between the detection coils and the shaft surface can be averaged because the plurality of first and second detection coils are provided. Accordingly, a detection accuracy can be prevented from being deteriorated under such error factors.

In another exemplary aspect, the plurality of first and second detection coils are lined up on a same circumference of the rotating shaft and/or the stationary shaft and disposed such that a detection region of the first detection coil alternates with a detection region of the second detection coil.

With the magnetostrictive torque sensor, because variations in the temperature and the quality of material on the shaft in the circumferential direction surface and gap fluctuations between the detection coils and the shaft surface can be averaged, a detection accuracy can be prevented from being deteriorated under such error factors. In addition, an error by misalignment between the first and second detection coil detection regions can be reduced, because the first and second detection coil detection regions are alternately arranged. Furthermore, such error can also be excluded based on a shaft rotation.

In another exemplary aspect, the plurality of first and second detection coils are lined up on a same circumference of the rotating shaft and/or the stationary shaft and disposed such that a detection region of the first detection coil overlaps with a detection region of the second detection coil.

With the magnetostrictive torque sensor, temperature and material quality variations on the shaft surface in the circumferential direction and gap fluctuations between the detection coils and the shaft surface can be averaged. Accordingly, a detection accuracy deterioration under such error factors can be avoided. In addition, an error by misalignment between the first and second detection coil detection regions can be prevented because the first and second detection coil detection regions are formed so as to overlap with each other.

In another exemplary aspect, the first and second oscillation circuits are driven alternately so as to avoid a mutual interference.

With the magnetostrictive torque sensor, a detection accuracy deterioration under a mutual interference can be avoided. In addition, detection regions can be easily optimized according to use conditions because the first and second detection coil detection regions can be arbitrarily set without considering a mutual interference.

In another exemplary aspect, a counting number changer is provided for changing the predetermined number N of the oscillating waves in one oscillating wave counting processing.

With the magnetostrictive torque sensor, the predetermined number N (counting number N) can be changed, and a measurement accuracy and response performance can also be adjusted according to use conditions. For example, a predetermined number N in one detection processing can be increased if a measurement accuracy is preferred, whereas a predetermined number N in one detection processing can be reduced if a response performance is preferred.

In another exemplary aspect, the shaft surface includes a magnetostrictive film that is formed by plating.

With the magnetostrictive torque sensor, a torque can be detected with higher accuracy, and a torque detection hysteresis can also be restrained, based on a magnetostriction inverse effect on the magnetostrictive film that accords to a torque. In addition, a sufficient detection accuracy can be obtained on the magnetostrictive film that is formed by plating (for example, nickel plating). Compared with a case where an amorphous magnetostrictive film or the like is formed by bonding, sputtering, or vapor deposition, etc., the magnetostrictive torque sensor of the present disclosure can achieve a significantly reduced cost. Furthermore, higher accuracy torque detection can be provided for an existing member (including resin) on which nickel is plated, for example.

In another exemplary aspect, there is provided a torque detection method for a magnetostrictive torque sensor that detects a torque of a rotating shaft and/or a stationary shaft using a magnetostriction inverse effect that occurs on a shaft surface. The magnetostrictive torque sensor includes a first detection coil that is disposed so as to detect a magnetic permeability change in a first direction on the shaft surface, the first detection coil detecting the magnetic permeability change in the first direction as an inductance change of the first detection coil; a second detection coil that is disposed so as to detect a magnetic permeability change in a second direction on the shaft surface, the second detection coil detecting the magnetic permeability change in the second direction as an inductance change of the second detection coil; a first oscillation circuit that oscillates autonomously at a predetermined reference frequency and causes phase shifts in oscillating waves according to the inductance change of the first detection coil; and a second oscillation circuit that oscillates autonomously at a predetermined reference frequency and causes phase shifts in oscillating waves according to the inductance change of the second detection coil. The method includes the steps of performing an oscillating wave counting processing and detecting the magnetic permeability change in the first direction based on a time required for the oscillating wave counting processing that counts a plurality of oscillating waves that are output from the first oscillation circuit and determines whether a counted number reaches a predetermined number N; performing an oscillating wave counting processing and detecting the magnetic permeability change in the second direction based on a time required for the oscillating wave counting processing that counts a plurality of oscillating waves that are output from the second oscillation circuit and determines whether a counted number reaches a predetermined number N; and detecting the torque of the rotating shaft and/or the stationary shaft based on a difference between the magnetic permeability of the first and second directions.

A torque detection accuracy can be improved with the torque detection method. Magnetic permeability changes on the shaft surface clearly appear as phase shifts in oscillating waves that are output from the first and second oscillation circuits configured as described above, and the phase shifts in the oscillating waves are accumulated equal to a number of the oscillating waves. In other words, the magnetic permeability changes in the first and second directions can be detected with higher accuracy. A torque of the rotating shaft or stationary shaft can also be detected with higher accuracy from the difference between these permeability changes. In addition, an oscillating wave counting processing is performed in order to count the number of oscillating waves that are output from the oscillation circuits and determine whether the counted number reaches a predetermined number N. Then, the accumulated phase shifts of the oscillating waves (magnetic permeability changes) are measured based on a time required for the oscillating wave counting processing. Accordingly, phase shift components of the oscillating waves can be measured with higher accuracy by using an inexpensive digital circuit. A resolution thereof is determined according to a time measuring counter speed and without depending on reference frequencies of the oscillation circuits. Accordingly, a stress detection can be performed with higher resolution while the reference frequencies of the oscillation circuits are optimized according to an object to be detected.

In another exemplary aspect, the first and second detection coils form closed magnetic paths between the first and second detection coils and the shaft surface in order to limit detection regions and/or detection directions on the shaft surface.

A torque detection accuracy can be improved with the detection method because detection regions and directions are limited on the shaft surface. Error components that may be included in phase shifts of oscillating waves may be accumulated because phase shifts of oscillating waves corresponding to a torque are detected after being accumulated equal to a number of the oscillating waves by using the magnetostrictive torque sensor of the present disclosure. Nevertheless, a SN ratio can be increased because detection regions and directions are limited on the shaft surface. A detection accuracy can also be improved because such error components can be reduced. Furthermore, there is no need to form stripes on the shaft surface by a groove, slit, thin film and so on because detection directions can be limited at a side of the detection coil. Accordingly, a torque detection of the present disclosure can be applied even to a rotating shaft and a stationary shaft on which such stripes cannot be formed.

In another exemplary aspect, the first and second detection coils are formed using a high magnetic-permeability material. The first and second detection coils includes a core, the closed magnetic paths being between the core and the shaft surface; and a coil that is wound around the core.

With the torque detection method, magnetic permeability changes on the shaft surface can be detected with higher accuracy by increasing magnetic flux densities that occurs in the closed magnetic paths.

In another exemplary aspect, the first oscillation circuit includes a plurality of first detection coils that are connected in series or parallel, whereas the second oscillation circuit includes a plurality of second detection coils that are connected in series or parallel.

With the torque detection method, temperature and material quality variations on the shaft surface and gap fluctuations between the detection coils and the shaft surface can be averaged because the plurality of first and second detection coils are provided. Accordingly, a detection accuracy can be prevented from being deteriorated under such error factors.

In another exemplary aspect, the plurality of first and second detection coils are lined up on a same circumference of the rotating shaft and/or the stationary shaft and disposed such that a detection region of the first detection coil alternates with a detection region of the second detection coil.

With the torque detection method, because variations in the temperature and the quality of material on the shaft in the circumferential direction surface and gap fluctuations between the detection coils and the shaft surface can be averaged, a detection accuracy can be prevented from being deteriorated under such error factors. In addition, an error by misalignment between the first and second detection coil detection regions can be reduced, because the first and second detection coil detection regions are alternately arranged. Furthermore, such error can also be excluded based on a shaft rotation.

In another exemplary aspect, the plurality of first and second detection coils are lined up on a same circumference of the rotating shaft and/or the stationary shaft and disposed such that a detection region of the first detection coil overlaps with a detection region of the second detection coil.

With the torque detection method, temperature and material quality variations on the shaft surface in the circumferential direction and gap fluctuations between the detection coils and the shaft surface can be averaged. Accordingly a detection accuracy deterioration under such error factors can be avoided. In addition, an error by misalignment between the first and second detection coil detection regions can be prevented because the first and second detection coil detection regions are formed so as to overlap with each other.

In another exemplary aspect, the first and second oscillation circuits are driven alternately so as to avoid a mutual interference.

With the torque detection method, a detection accuracy deterioration under a mutual interference can be avoided. In addition, detection regions can be easily optimized according to use conditions because the first and second detection coil detection regions can be arbitrarily set without considering a mutual interference.

In another exemplary aspect, the predetermined number N of the oscillating waves in one oscillating wave counting processing is changed.

With the torque detection method, the predetermined number N (counting number N) can be changed, and a measurement accuracy and response performance can also be adjusted according to use conditions. For example, a predetermined number N in one detection processing can be increased if a measurement accuracy is preferred, whereas a predetermined number N in one detection processing can be reduced if a response performance is preferred.

In another exemplary aspect, the shaft surface includes a magnetostrictive film that is formed by plating.

With the torque detection method, a torque can be detected with higher accuracy, and a torque detection hysteresis can also be restrained, based on a magnetostriction inverse effect on the magnetostrictive film that accords to a torque. In addition, a sufficient detection accuracy can be obtained on the magnetostrictive film that is formed by plating (for example, nickel plating). Compared with a case where an amorphous magnetostrictive film or the like is formed by bonding, sputtering, or vapor deposition, etc., the magnetostrictive torque sensor of the present disclosure can achieve a significantly reduced cost. Furthermore, a higher accuracy torque detection can be provided for an existing member (including resin) on which nickel is plated, for example.

According to the above-mentioned various exemplary aspects, a torque detection accuracy can be improved. Magnetic permeability changes on the shaft surface clearly appear as phase shifts in the oscillating waves output from the first and second oscillation circuits. The magnetic permeability changes in the first and second directions can be detected with higher accuracy because the oscillating wave phase shifts are accumulated according to a number of oscillating waves. A torque of the rotating or stationary shaft can also be detected with higher accuracy based on a difference between the magnetic permeability changes. In addition, an oscillating wave counting processing is carried out in order to count a number of oscillating waves output from the oscillation circuits and determine whether the counted numbers reach a predetermined number N. The oscillating wave phase shifts (magnetic permeability changes) are measured after being accumulated based on a time required for the oscillating wave counting processing. Accordingly, oscillating wave phase shift components can be measured with a higher accuracy by using an inexpensive digital circuit. In addition, a higher resolution stress detection can be performed while reference frequencies of the oscillation circuits are optimized according to an object to be detected because a resolution is determined based on a time measuring counter speed and independent of the reference frequencies of the oscillation circuits.

BRIEF DESCRIPTION OF THE DRAWINGS

Various exemplary aspects will be described with reference to the drawings, wherein.

DETAILED DESCRIPTION OF EMBODIMENTS

Next, various embodiment of the present disclosure will be described with reference to the drawings. Waveforms in the drawings show not only actually detected waveforms but also simulation waveforms.

I. First Embodiment

Figure 1:
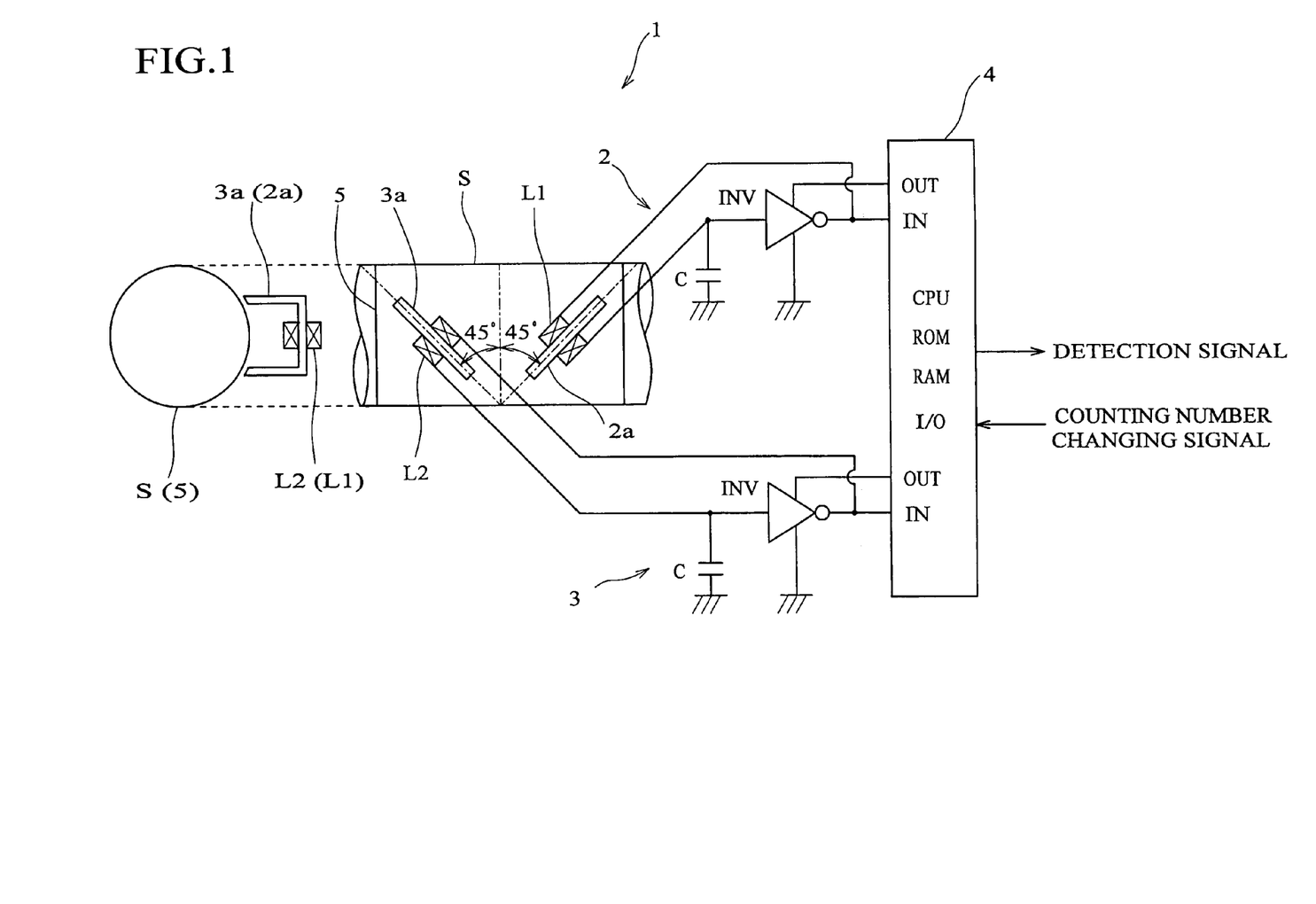
FIG. 1 is a block diagram showing a configuration of a magnetostrictive torque sensor of a first embodiment of the present disclosure.

A magnetostrictive torque sensor 1 shown in FIG. 1 detects a torque of a rotating shaft S (or stationary shaft) by a magnetostriction inverse effect that occurs on a shaft surface. The magnetostrictive torque sensor 1 includes a first detection coil L1; a second detection coil L2; a first oscillation circuit 2; a second oscillation circuit 3; and a detection circuit 4.

The first detection coil L1 is disposed so as to detect a magnetic permeability change as an inductance change on a shaft surface in a first direction, a plus 45-degree direction, for example. The second detection coil L2 is disposed so as to detect a magnetic permeability change as an inductance change on a shaft surface in a second direction, a minus 45-degree direction, for example.

The detection coils L1 and L2 of the present embodiment include a core that is formed using a high magnetic permeability material and a coil that is wound around the core in order to limit a detection region and direction on the shaft surface. More specifically, a coil is wound around U-shaped ferrite cores 2a and 3a, and a closed magnetic path is formed between U-shaped ferrite cores 2a and 3a ends and a shaft surface by placing the ends close to the shaft surface. Accordingly, magnetic paths of the first and second directions are formed in a limited region of the shaft surface. Magnetic permeability changes can thus be detected in the magnetic paths.

The first oscillation circuit 2 autonomously oscillates at a predetermined reference frequency and causes phase shifts in oscillating waves according to an inductance change of the first detection coil L1. The second oscillation circuit 3 autonomously oscillates at a predetermined reference frequency and causes phase shifts in oscillating waves according to an inductance change of the second detection coil L2. The oscillation circuits 2 and 3, which cause phase shifts in oscillating waves according to inductance changes of the detection coils L1 and L2, can be configured by disposing the detection coils L1 and L2 in a feedback circuit of a Schmitt oscillation circuit, for example.

The Schmitt oscillation circuit utilizes hysteresis characteristics of a Schmitt inverter (INV). The Schmitt oscillation circuit includes the Schmitt INV; a capacitor C that is connected to an input side of the Schmitt INV; a feedback circuit that feeds back a Schmitt INV output to the Schmitt INV input side; and a resistance element that is interposed in the feedback circuit.

Voltage at each end of the capacitor C is 0V (zero voltages) in an initial state of the Schmitt oscillation circuit because no charges are accumulated in the capacitor C. An output is a H level (5V) at this time because an input side voltage (Vin) of the Schmitt INV is not more than $V_L$. A current flows into the Schmitt INV input side via the U-shaped ferrite core 2a when an output side voltage (Vout) of the Schmitt INV is 5V. Voltages at the capacitor C ends increases, as charges are accumulated gradually in the capacitor C. The Vout of the Schmitt INV is changed to be a L level (0V) when the Vin of the Schmitt INV reaches $V_H$. When the Vout is 0V, the Vin gradually decreases, as the capacitor C discharges. The Vout is changed to be a H level when the Vin is down to $V_L$.

A rectangular wave with a predetermined frequency can be obtained from the Schmitt INV output side by repeating the above-described operation. A Schmitt oscillation circuit frequency $f$ is determined according to a charge period $T_H$ and a discharge period $T_L$, the oscillation frequency $f$ being equal to 1/T. The charge and discharge periods $T_H$ and $T_L$ are determined according to each constant of the capacitor C and the resistance element. Accordingly, phase shifts can be provided in oscillating waves of the Schmitt oscillation circuit according to inductance changes in the detection coils L1 and L2 by disposing the detection coils L1 and L2 in a feedback circuit as resistance elements.

The oscillation circuit of the present disclosure is not limited to the Schmitt oscillation circuit. A CR, LC or crystal oscillation circuit may also be used if such an oscillation circuit can cause phase shifts in oscillating waves according to inductance changes in the detection coils L1 and L2.

The detection circuit 4 (i.e., a controller) is formed using, for example, a microcomputer (one-chip microcomputer) that integrates a CPU, a ROM, a RAM, an I/O, a comparator and so on. The detection circuit 4 carries out torque detection processing according to a written program on the ROM, which will be described later. In addition, the detection circuit 4 may also be formed with a plurality of microcomputers or one or a plurality of ICs.

The detection circuit 4 includes a first direction magnetic permeability detector that performs an oscillating wave counting processing and detects a magnetic permeability change in the first direction based on a time required for the oscillating wave counting processing that counts a plurality of oscillating waves that are output from the first oscillation circuit 2 and determines whether the counted number reaches a predetermined number N; a second direction magnetic permeability detector that performs an oscillating wave counting processing and detects a magnetic permeability change in the second direction based on a time required for the oscillating wave counting processing that counts a plurality of oscillating waves that output from the second oscillation circuit 3 so as to determine whether the counted number reaches the predetermined number N; and a torque detector that detects a torque of the rotating shaft S based on a difference between the first and second direction permeabilities.

According to the above-described configuration, a torque detection accuracy of the magnetostrictive torque sensor 1 can be improved. Magnetic permeability changes on the shaft surface clearly appear as phase shifts in the output oscillating waves from the first and second oscillation circuits 2 and 3. Further, first and second directions magnetic permeability changes can also be detected with higher accuracy because the phase shifts in the oscillating waves are accumulated equal to the number of the oscillating waves. A torque of the rotating shaft S can also be detected with higher accuracy based on a difference between the magnetic permeability changes. Oscillating waves phase shift components can be measured with higher accuracy with an inexpensive digital circuit because the accumulated phase shifts (magnetic permeability change) of the oscillating waves are measured based on the required time for the oscillating wave counting processing that counts the number of the output oscillating waves from the oscillation circuits 2 and 3 and determines whether the counted number reaches the predetermined number N. In addition, a resolution is determined according to the time measuring counter speed without depending on the reference frequencies of the oscillation circuits 2 and 3. Accordingly, a stress detection can be performed with a higher resolution while the reference frequencies of the oscillation circuits 2 and 3 are optimized according to an object to be detected.

Error components in the phase shifts of the oscillating waves may be accumulated when the magnetostrictive torque sensor 1 detects the oscillating wave phase shifts according to a torque by accumulating the phase shifts with equal numbers of the oscillating waves. It is preferable that a closed magnetic path be formed between a shaft surface and the first and second detection coils L1 and L2 in order to limit a detection region and direction on the shaft surface. The accumulated error components can thus be reduced by limiting the detection region and direction on the shaft surface with the closed magnetic path, with a resultant increased SN ratio. Accordingly, a detection accuracy can be improved. In addition, no stripe needs to be formed on the shaft surface by means of a groove, slit, thin film and so on because the detection direction can be limited by the closed magnetic path on each side of the detection coil L1 and L2. Accordingly, the torque detection of the present disclosure can be applied to the rotating shaft S even if the stripes cannot be formed on the rotating shaft S.

It is also preferable that the first and second oscillation circuits 2 and 3 be driven alternately in order to avoid a mutual interference. First, the oscillating wave counting processing of the first oscillation circuit 2 is performed when a second oscillation circuit 3 oscillation drive is halted, for example. After that, the oscillating wave counting processing of the second oscillation circuit 3 is performed when a first oscillation circuit 2 oscillation drive is halted. Then, a difference between measurement times required for each of the oscillating wave counting processing is calculated. Accordingly, deterioration in a detection accuracy because of a mutual interference can be avoided. In addition, the detection region can be easily optimized according to use conditions because each detection region of the first and second detection coils L1 and L2 can be set arbitrarily without causing a mutual interference.

It is also preferable that a surface of the rotating shaft S be formed using a magnetostrictive film 5 that is formed by plating when the magnetostrictive torque sensor 1 detects a torque of the rotating shaft S. For example, a part or all of the rotating shaft S is plated with the magnetostrictive film 5 made of nickel alloy. Accordingly, not only can a torque be detected with higher accuracy, but hysteresis in a torque detection can also be reduced based on a magnetostriction inverse effect on the magnetostrictive film 5 according to the torque. In addition, manufacturing cost can be reduced significantly compared with a case in which an amorphous magnetostrictive film is formed by, for example, bonding, sputtering, or vapor deposition because the magnetostrictive film 5 of the magnetostrictive torque sensor 1 can obtain a sufficient detection accuracy with the plated magnetostrictive film 5. A higher accuracy torque detection also can be performed for an existing member (including resin) on which nickel is plated, for example.

Next, accumulation of oscillating wave phase shifts in the present disclosure will be described with reference to FIGS. 2 and 3.

Figure 2:
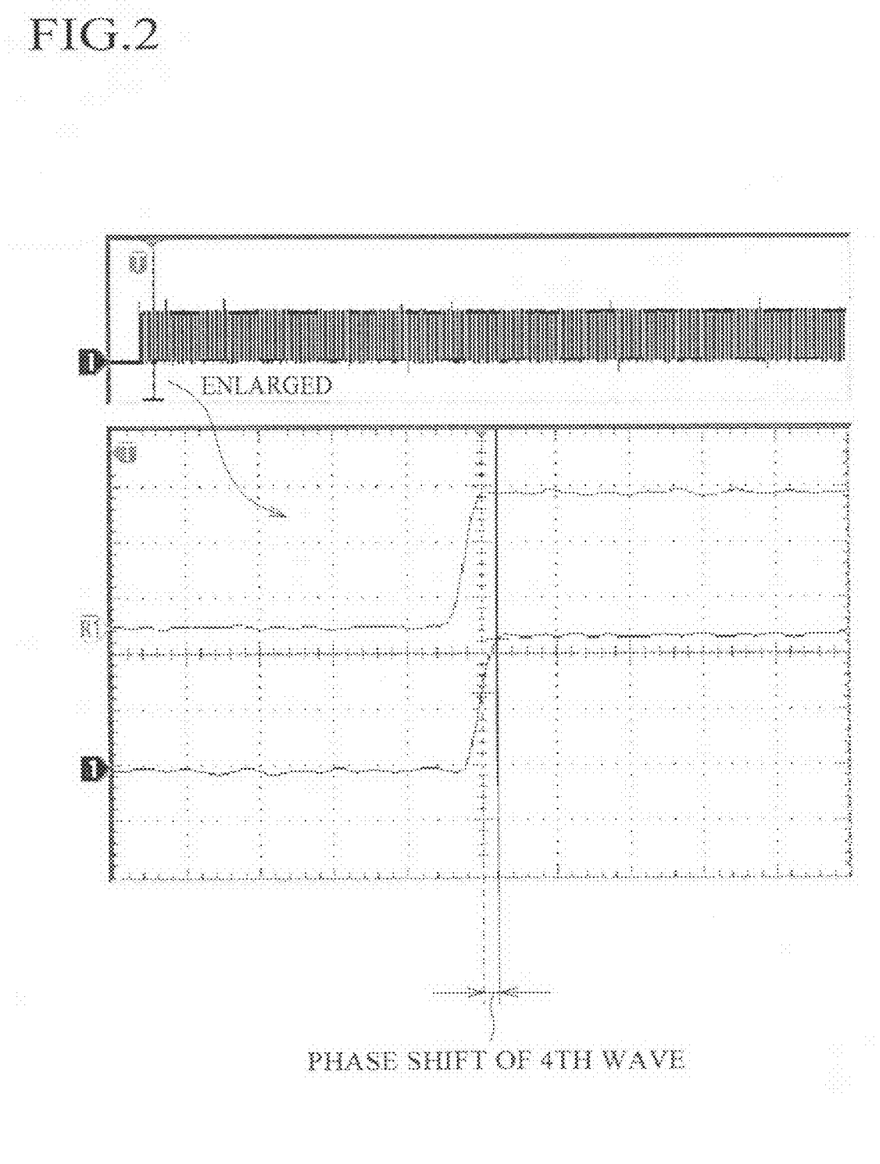
FIG. 2 is an explanatory view showing a phase shift accumulation of oscillating waves (an enlarged view of a detected waveform at a starting point)
Figure 3:
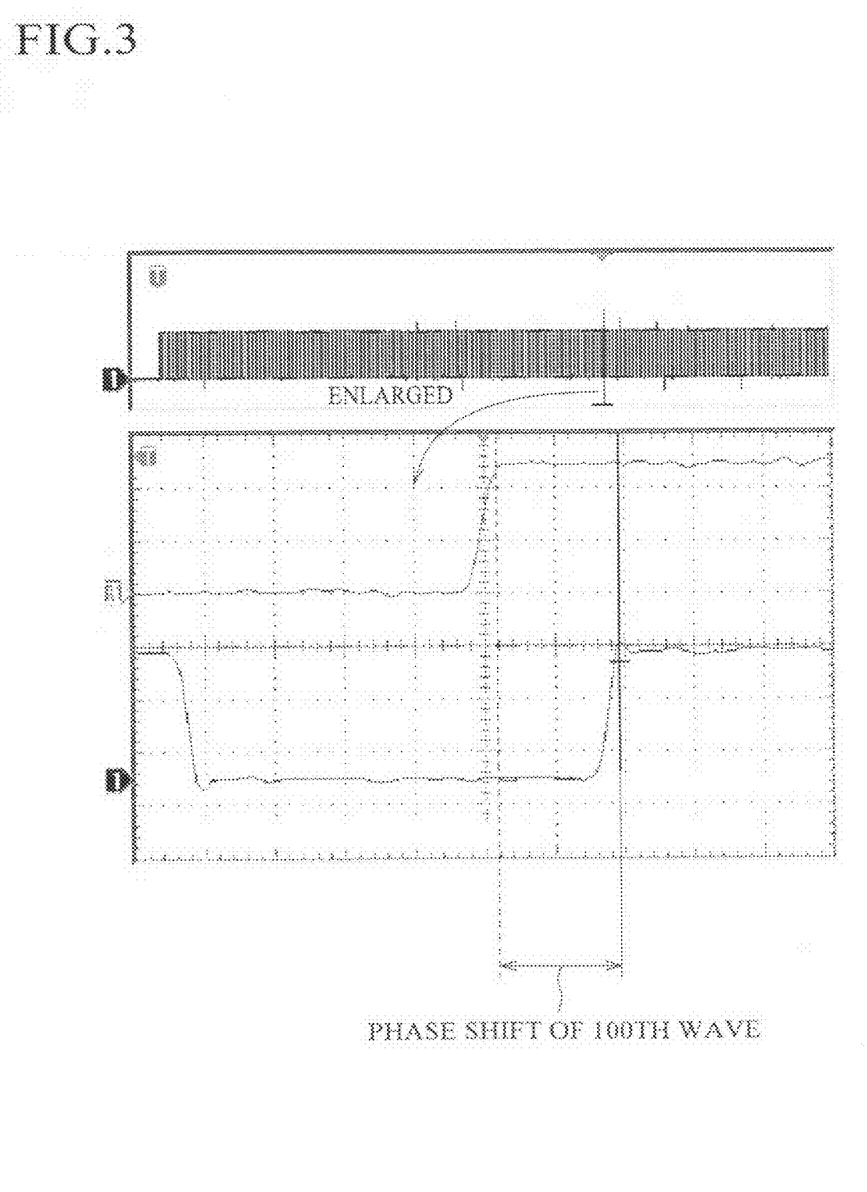
FIG. 3 is a explanatory view showing a phase shift accumulation of oscillating waves (an enlarged view of a detected waveform at an ending point)

Waveforms shown in FIGS. 2 and 3 are output waveforms from the oscillation circuits 2 and 3 per one detection processing. An oscillating wave counting processing is performed so as to count a number of oscillating waves that are output from the oscillation circuits 2 and 3 and determine whether a counted number reaches a predetermined number N. Accumulated phase shifts of the oscillating waves are then measured based on a time required for the oscillating wave counting processing. The predetermined counting number N of the oscillating waves in the oscillating wave counting processing is set to be 100. Upper waveforms shows a case where no torque is applied to the rotating shaft S, whereas lower waveforms shows a case where a torque is applied to the rotating shaft S (see FIGS. 2 and 3).

A difference between oscillating waves phase shifts are unclear because few phase shifts are accumulated at a detected waveform starting point, that is, in a phase in which an oscillating wave counted number N in the oscillating wave counting processing is smaller (see FIG. 2). In contrast, oscillating waves phase shifts are accumulated more and a difference between the oscillating waves phase shifts are clearer (see FIG. 3). Thus, the oscillating waves phase shifts can be measured easily when an oscillating wave counted number N is larger. In addition, a torque that affects the rotating shaft S can be measured with higher accuracy based on oscillating waves phase shifts because the oscillating waves phase shifts are larger in proportion to the torque affecting the rotating shaft S. Furthermore, the phase shifts of the output oscillating waves from the oscillation circuits 2 and 3 appear in opposite directions under the inverse effect of magnetostriction. Accordingly, based on a difference between the oscillating waves phase sifts, not only can a torque amount and polarity of the rotating shaft S be detected, but also detected values can be obtained such that temperature and displacement errors are canceled out therein.

Next, the steps of various processing of the detection circuit 4 will be specifically described with reference to FIG. 4 through FIG. 7.

Figure 4:
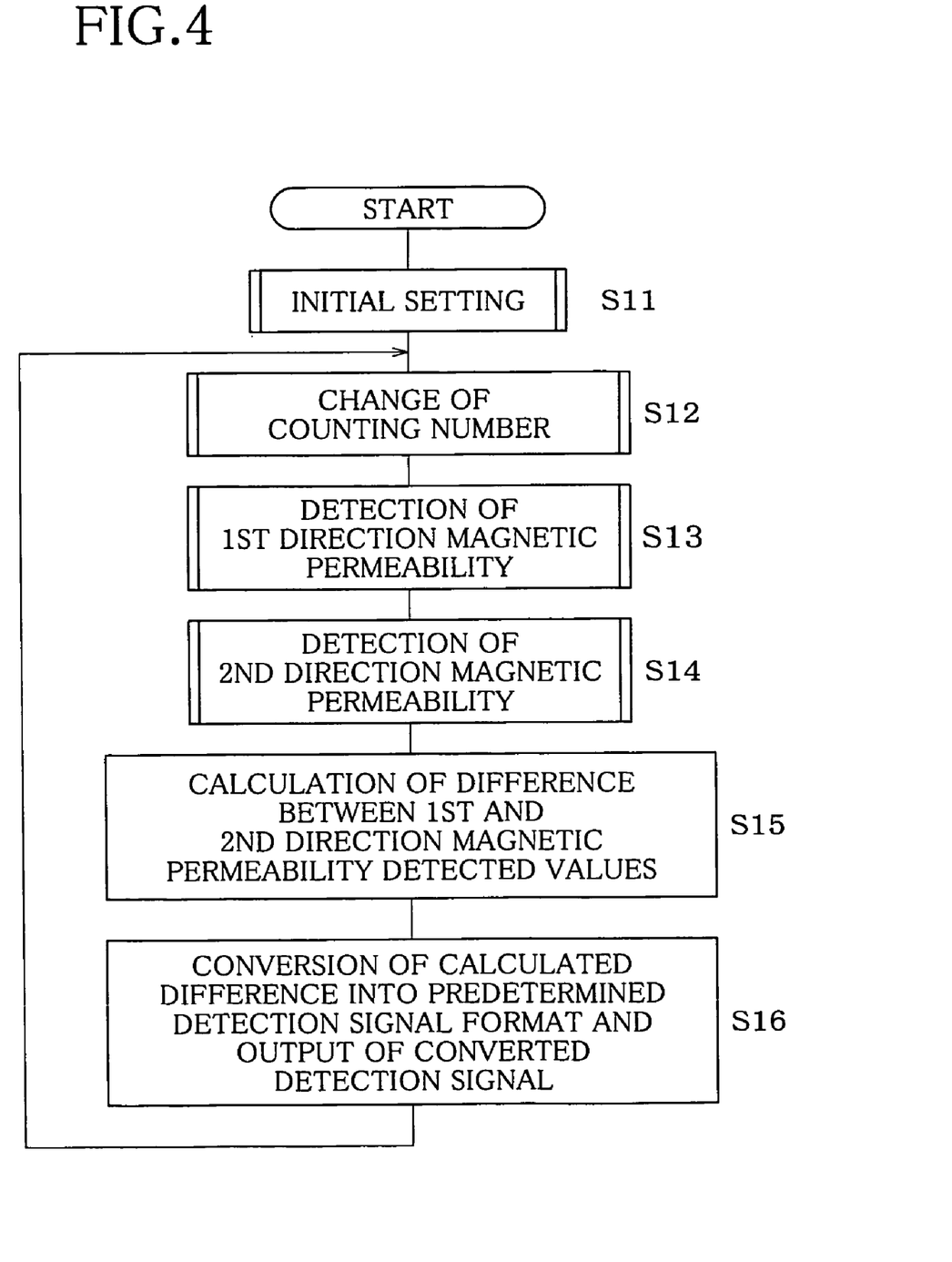
FIG. 4 is a flowchart showing steps of torque detection processing in a detection circuit.

A torque detection (torque detector) includes the successive steps of setting a default (S11: including an initial value setting of an oscillating wave counting number N); changing a counting number (S12); detecting a first direction magnetic permeability (S13: a first direction magnetic permeability detector); detecting a second direction magnetic permeability (S14: a second direction magnetic permeability detector); calculating a difference between first and second direction magnetic permeability detected values that are obtained via the magnetic permeability detection of steps S13 and S14 (S15); and converting the calculated difference (torque detected value) into a predetermined detection signal format and outputting the converted detection signal (S16), as shown in FIG. 4.

Figure 5:
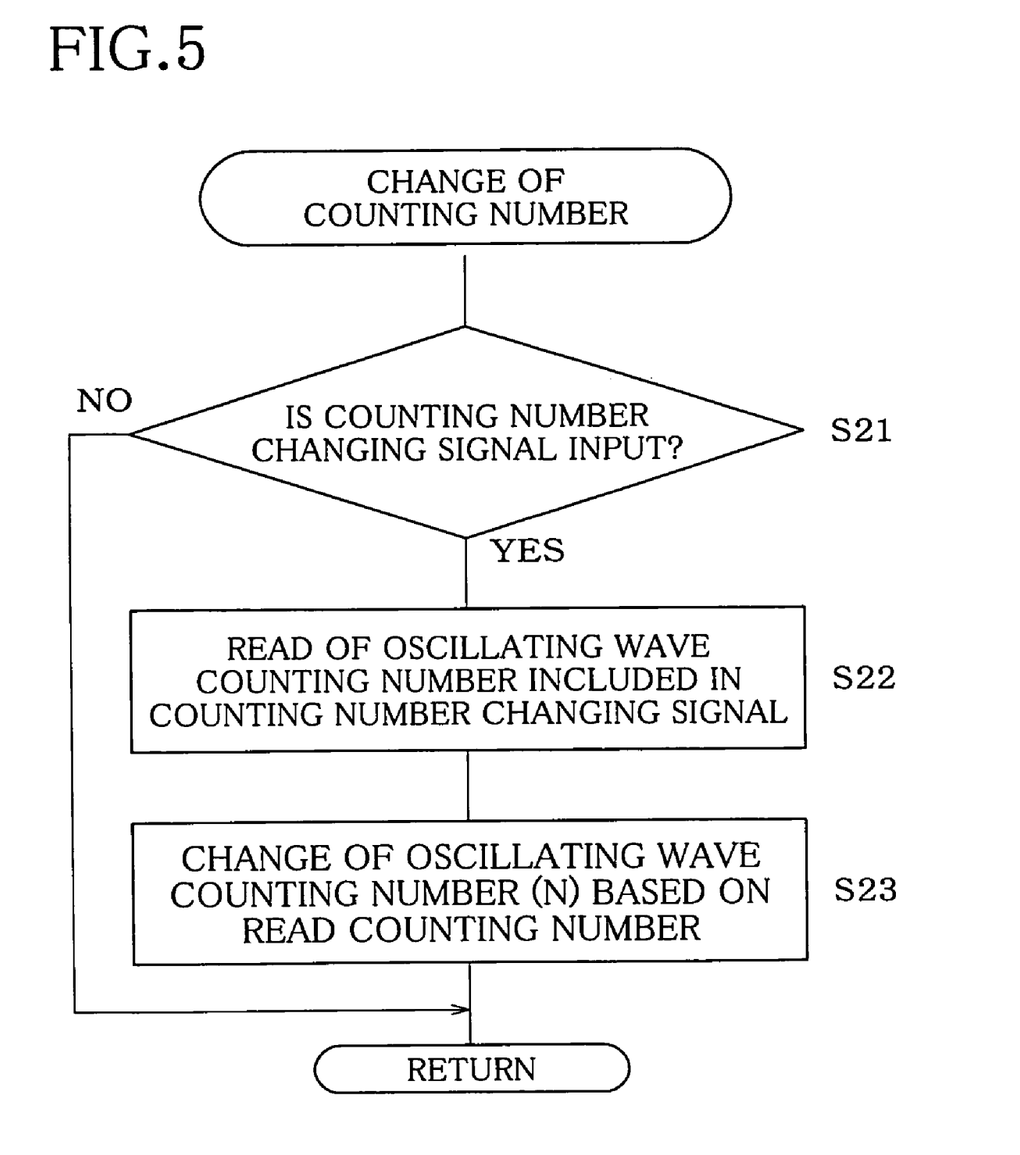
FIG. 5 is a flowchart showing steps of set number changing processing in the detection circuit.

A change of a counting number includes the successive steps of determining whether a counting number changing signal is input (S21); reading an oscillating wave counting number N that is included in the counting number changing signal (S22) when a determination result is 'YES'; and changing the oscillating wave counting number N in accordance with the read oscillating wave counting number N (S23), as shown in FIG. 5.

Figure 6:
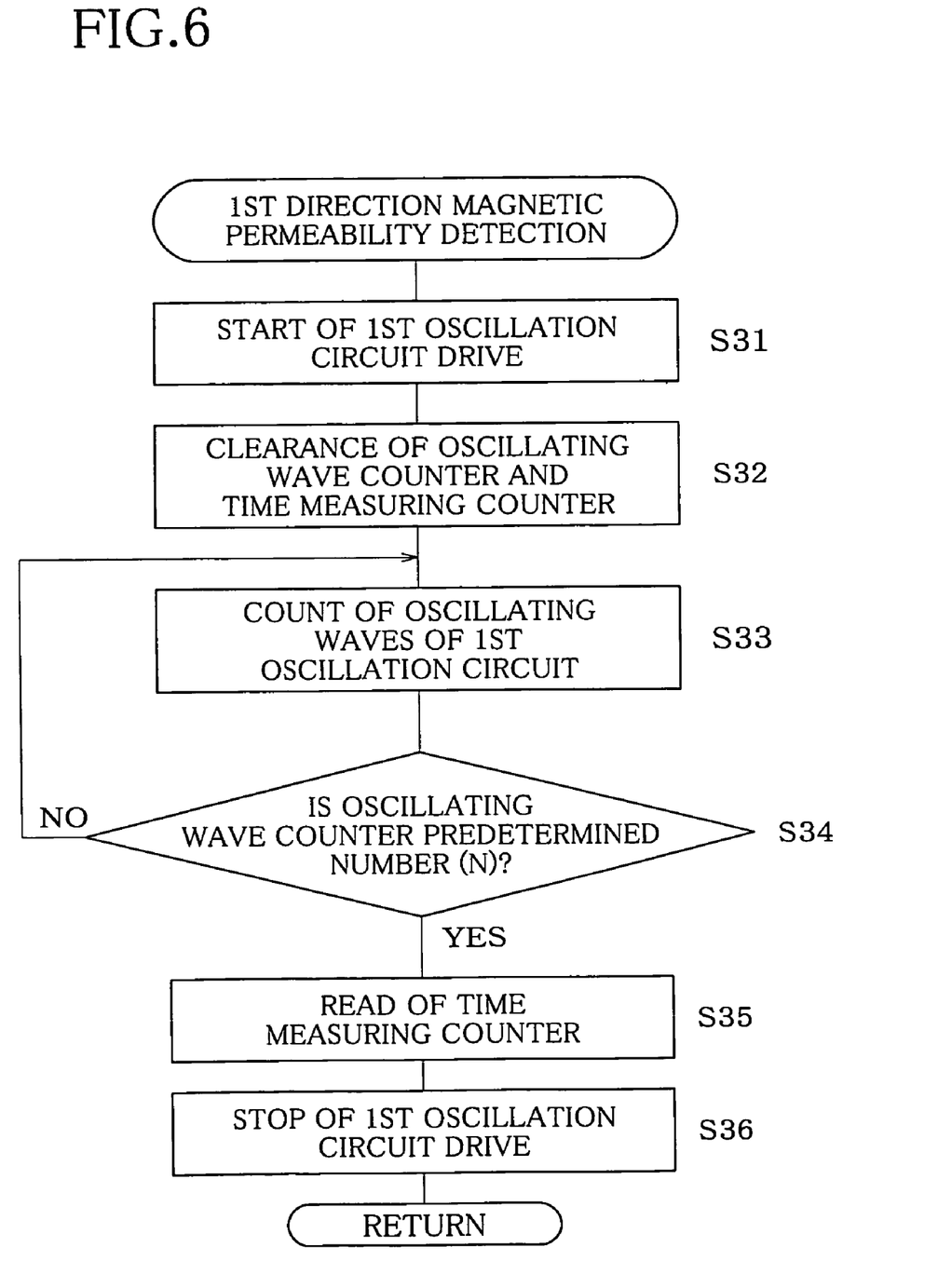
FIG. 6 is a flowchart showing steps of first direction magnetic permeability detection processing in the detection circuit.

A first direction magnetic permeability detection includes the successive steps of starting a first oscillation circuit 2 drive (S31); clearing an oscillating wave counter and a time measuring counter (S32); counting a number of oscillating waves that are output from the first oscillation circuit 2 (S33); determining whether the counted number reaches a predetermined number N (S34); reading a time measuring counter value (a first direction magnetic permeability detected value) when the counted number reaches N (S35); and stopping the first oscillation circuit 2 drive (S36), as shown in FIG. 6. In addition, step S32 corresponds to a counter clearing processing, steps S33 and S34 correspond to an oscillating wave counting processing and step S35 corresponds to a time measuring processing.

Figure 7:
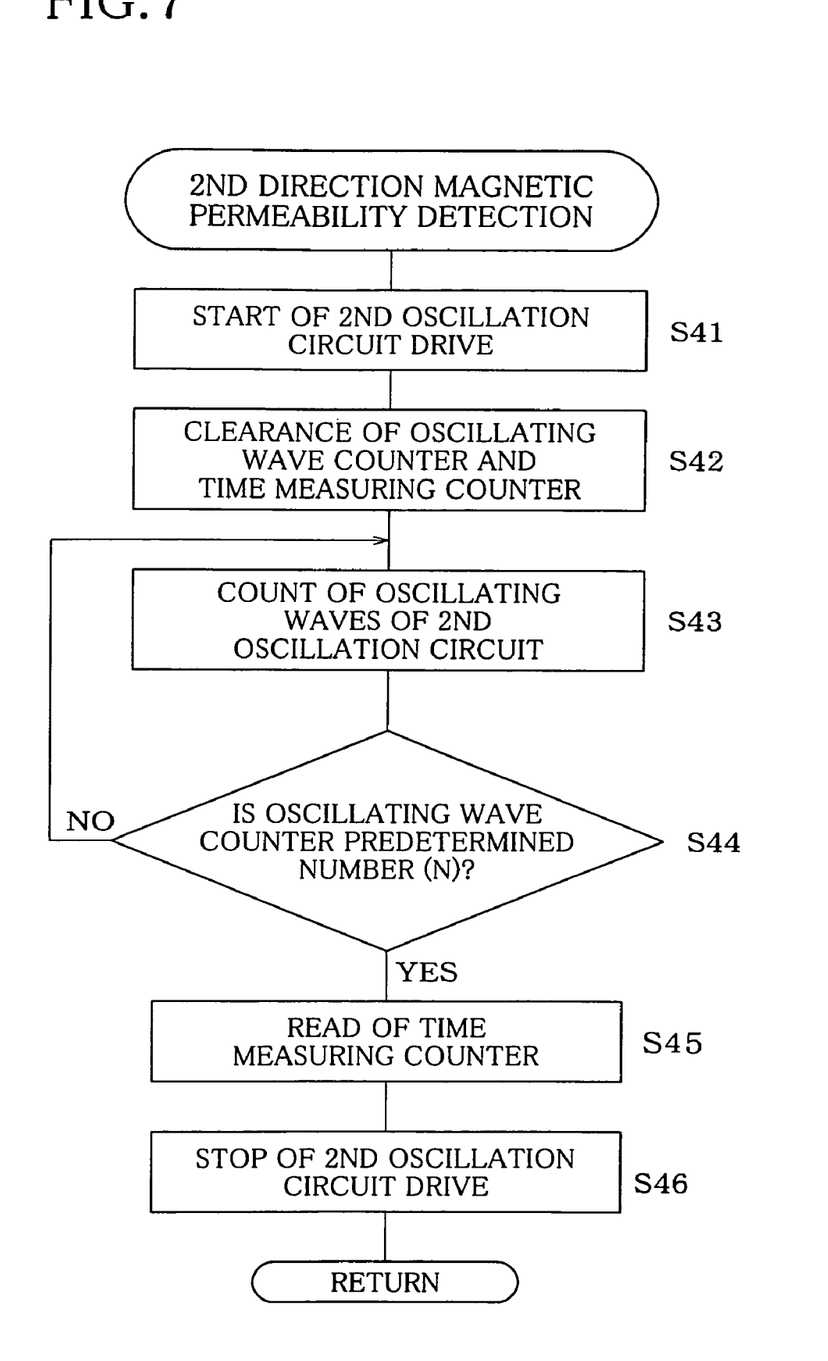
FIG. 7 is a flowchart showing steps of second direction magnetic permeability detection processing in the detection circuit.

A second direction magnetic permeability detection includes the successive steps of starting a second oscillation circuit 3 drive (S41); clearing a oscillating wave counter and a time measuring counter (S42); counting a number of oscillating waves that are output from the second oscillation circuit 3 (S43); determining whether the counted number reaches a predetermined number N (S44); reading a time measuring counter value (second direction magnetic permeability detected value) when the oscillating wave counted number reaches N (S45); and stopping the second oscillation circuit 3 drive (S46), as shown in FIG. 7. In addition, step S42 corresponds to a counter clearing processing, steps S43 and S44 correspond to an oscillating wave counting processing and step S45 corresponds to a time measurement processing.

According to the present embodiment configured as described above, there is provided the magnetostrictive torque sensor 1 that detects a torque of the rotating shaft S by using a magnetostriction inverse effect that occurs on the shaft surface. The magnetostrictive torque sensor 1 includes: the first detection coil L1 that is disposed so as to detect a magnetic permeability change as an inductance change on a shaft surface in a first direction; the second detection coil L2 that is disposed so as to detect a magnetic permeability change as an inductance change on the shaft surface in a second direction; the first oscillation circuit 2 that oscillates autonomously at a predetermined reference frequency and causes phase shifts in oscillating waves according to the inductance change of the first detection coil L1; the second oscillation circuit 3 that oscillates autonomously at a predetermined reference frequency and causes phase shifts in oscillating waves according to the inductance change of the second detection coil L2; the first direction magnetic permeability detector that performs an oscillating wave counting processing and detects the magnetic permeability change in the first direction based on a time required for the oscillating wave counting processing that counts a plurality of oscillating waves that are output from the first oscillation circuit 2 and determines whether a counted number reaches a predetermined number N; the second direction magnetic permeability detector that performs an oscillating wave counting processing and detects the magnetic permeability change in the second direction based on a time required for the oscillating wave counting processing that counts a plurality of oscillating waves that are output from the second oscillation circuit 3 and determines whether a counted number reaches a predetermined number N; and the torque detector that detects the torque of the rotating shaft S based on a difference in the magnetic permeability between the first and second directions. As a result, there can be provided improved torque detection accuracy.

Magnetic permeability changes on the shaft surface clearly appear as phase shifts and the phase shifts in the oscillating waves are accumulated equal to a number of the oscillating waves that are output from the first and second oscillation circuits 2 and 3. The magnetic permeability changes in the first and second directions can thus be detected with higher accuracy. The torque of the rotating shaft S can also be detected with higher accuracy from the difference between the first and second oscillation circuits 2 and 3 magnetic permeability changes. Phase shift components of the oscillating waves can be measured with higher accuracy using an inexpensive digital circuit because a number of output oscillating waves from the oscillation circuits 2 and 3 are counted and the counted numbers are determined whether to reach the predetermined number N through the oscillating wave counting processing, and accumulated phase shifts of the oscillating waves (the magnetic permeability changes in the first and second directions) are measured based on a time required for the oscillating wave counting processing. In addition, stress can also be detected with higher resolution while reference frequencies of the oscillation circuits 2 and 3 are optimized according to an object to be detected because a resolution thereof is determined according to a time measuring counter speed and without depending on the reference frequencies of the oscillation circuits 2 and 3.

Closed magnetic paths are formed between the first and second detection coils and the shaft surface in order to limit a detection region and direction on a shaft surface. As a result, a torque detection accuracy can be further improved. The magnetostrictive torque sensor 1 of the present disclosure detects the phase shifts of the oscillating waves according to a torque by accumulating the phase shifts equal to a number of the oscillating waves. In other words, although error components in the phase shifts of the oscillating waves may also be accumulated, a SN ratio can be increased while such accumulated error components are being reduced by limiting the detection region and direction on the shaft surface. As a result, detection accuracy can be improved. In addition, because the detection direction can be limited at each side of the detection coils L1 and L2, there is required no stripe on the shaft surface, such as a grooves, slit, thin film and so on. Thus, the torque detection of the present disclosure can be applied to a rotating or stationary shaft on which any of the above-mentioned stripe cannot be formed.

The first and second detection coils L1 and L2, which are formed from a high magnetic-permeability material, include the cores that form the closed magnetic paths between the cores and the shaft surface; and the coils that are wound around the cores. Accordingly, the magnetic permeability changes on the shaft surface can be detected with higher accuracy by increasing the magnetic flux densities in the closed magnetic paths.

The first and second oscillation circuits 2 and 3 are driven alternately so as to avoid a mutual interference. Deterioration in the detection accuracy because of a mutual interference can thus be avoided. In addition, detection regions can be easily optimized according to use conditions because the first and second detection coils L1 and L2 detection regions can be set arbitrarily without a mutual interference.

The counting number N can be changed and the measurement accuracy and response performance can also be adjusted according to use conditions because the magnetostrictive torque sensor 1 includes a counting number changing device that changes the counting number N of the oscillating waves in each oscillating wave counting processing. For example, a counting number N in each detection processing can be increased when a measurement accuracy is given more priority, whereas a counting number N in each detection processing can be reduced when a response performance is given more priority.

Not only can a torque be detected with higher accuracy, but hysteresis in a torque detection can also be reduced, based on an inverse effect of the magnetostriction on the magnetostrictive film 5 according to the torque because the shaft surface is the magnetostrictive film 5 that is formed by plating. In addition, a manufacturing cost can be reduced significantly compared with a case in which, for example, an amorphous magnetostrictive film is used that is formed by bonding, sputtering, or vapor deposition, etc. and a higher accuracy torque detection can also be performed with respect to an existing member (including resin) on which nickel is plated, for example, because the magnetostrictive torque sensor 1 of the present disclosure can yield a sufficient detection accuracy on the magnetostrictive film that is formed by plating, for example, nickel plating.

II. Second Embodiment

A magnetostrictive torque sensor 11 of a second embodiment of the present disclosure will be described with reference to FIGS. 8, 9A, 9B, 10A and 10B. The same reference numerals of the first embodiment are given to portions of the second embodiment that are common to the first embodiment, a description of which is incorporated by reference to the description of the first embodiment with respect to the common portions.

Figure 8:
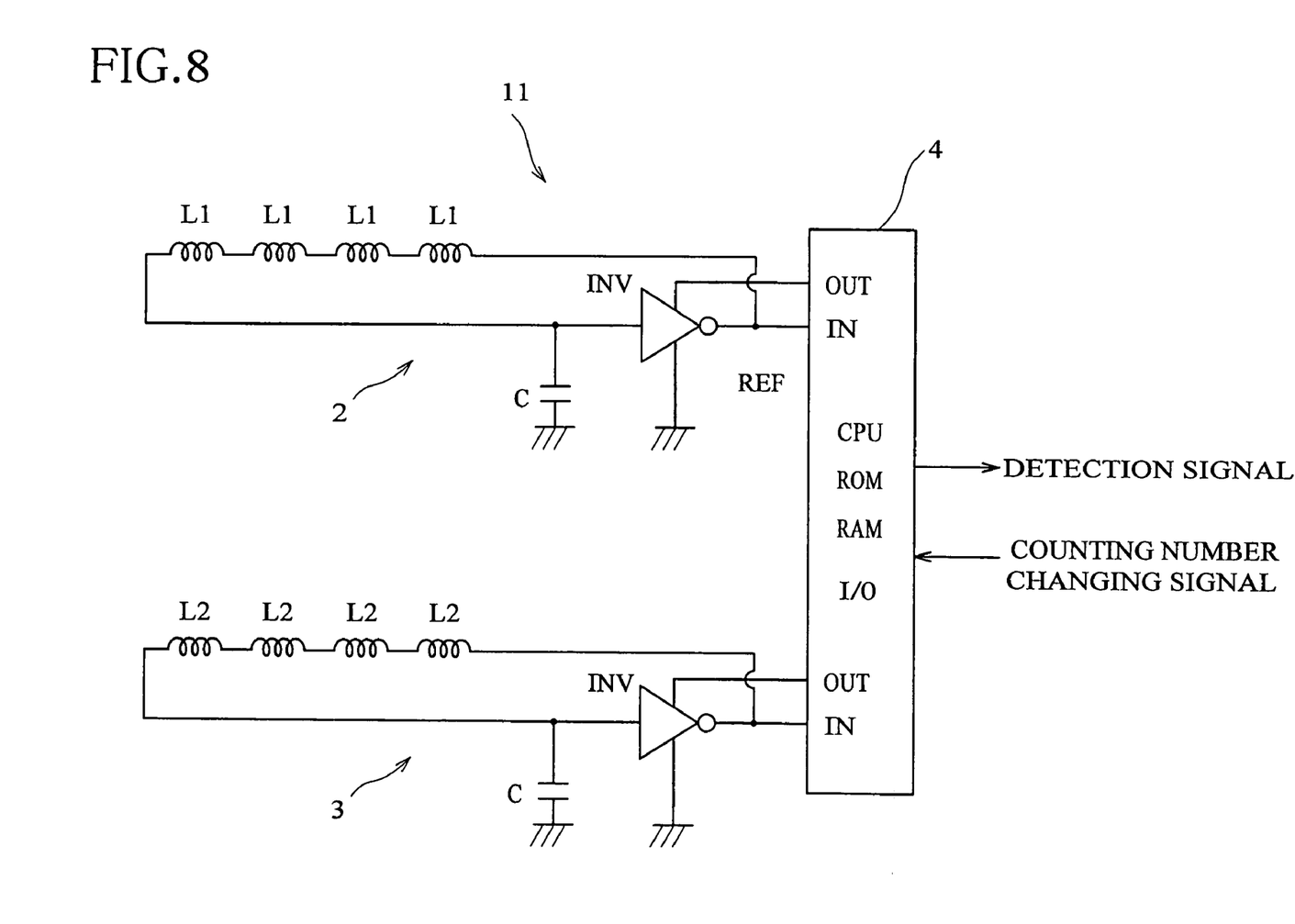
FIG. 8 is a block diagram showing a configuration of a magnetostrictive torque sensor of a second embodiment of the present disclosure.
Figure 9A:
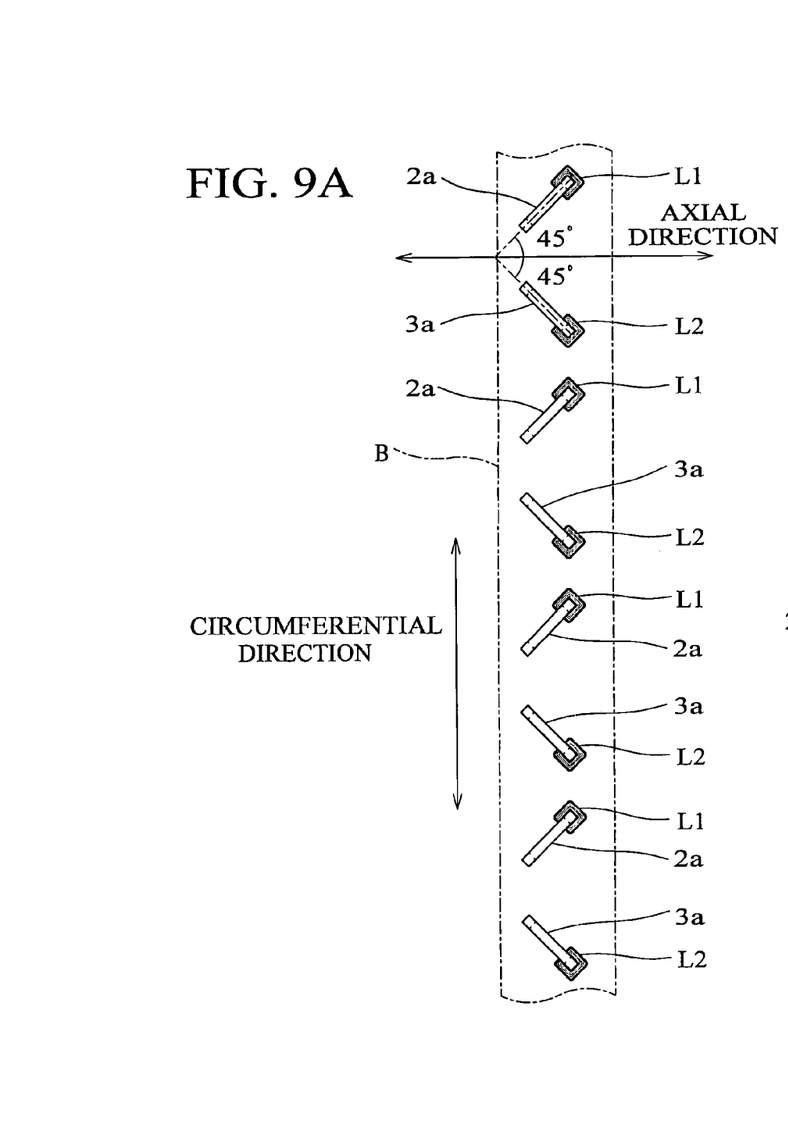
FIG. 9A is a development plan view showing a first arrangement example of detection coils.
Figure 9B:
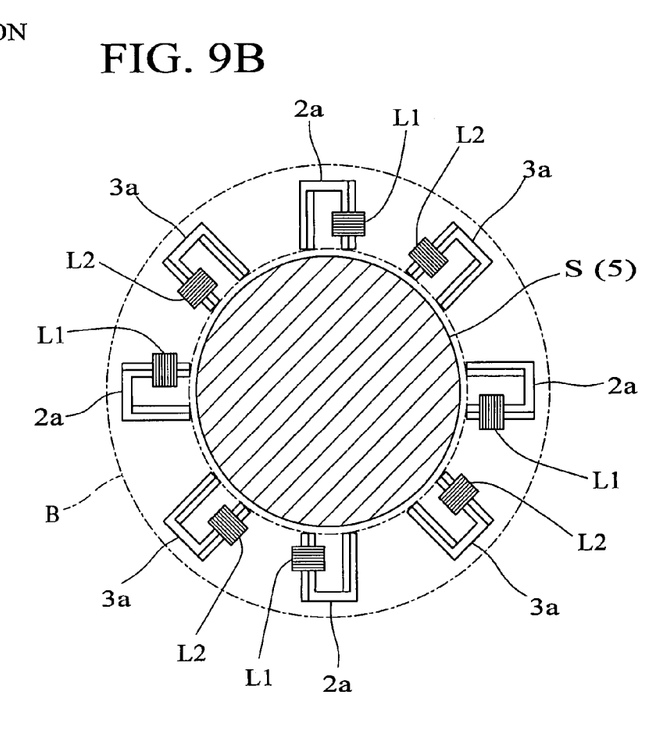
FIG. 9B is a side view showing the first arrangement example of detection coils.
Figure 10A:
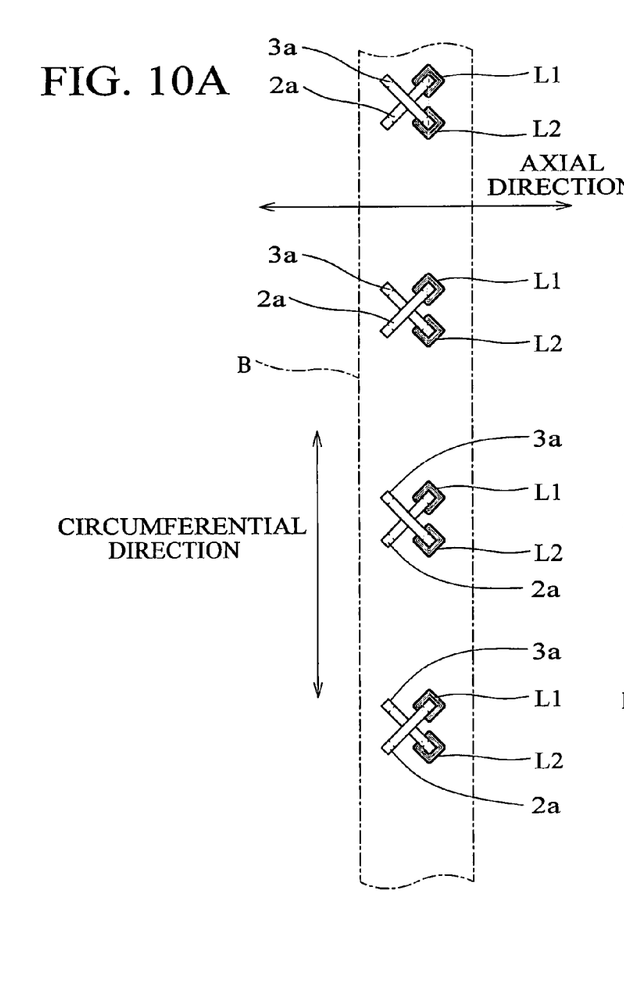
FIG. 10A is a development plan view showing a second arrangement example of detection coils.
Figure 10B:
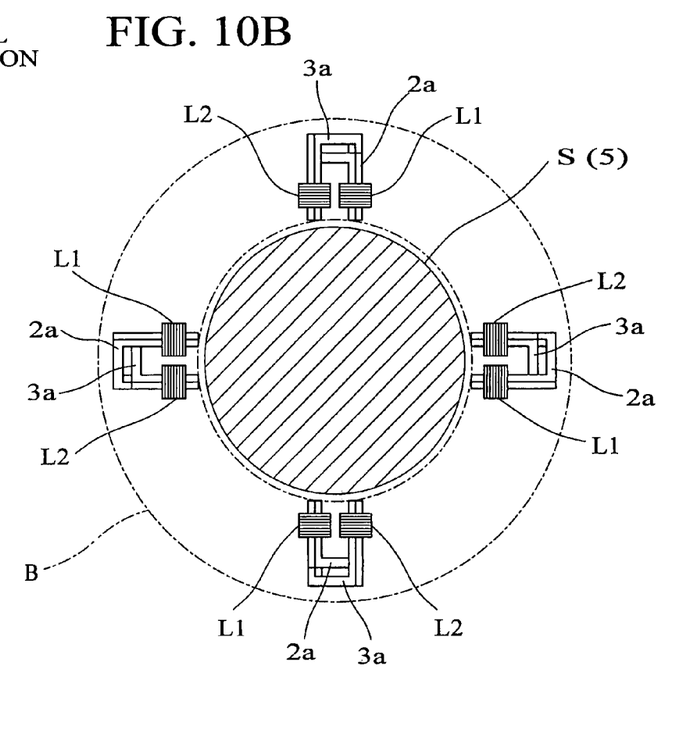
FIG. 10B is a side view showing the second arrangement example of detection coils.

Unlike the first embodiment, however, each of the oscillation circuits 2 and 3 includes a plurality of detection coils L1 and L2 in the magnetostrictive torque sensor 11 of the second embodiment (see FIG. 8). More specifically, the first oscillation circuit 2 is provided with a plurality (for example, four) of first detection coils L1 that are connected in series (or parallel), whereas the second oscillation circuit 3 is provided with a plurality (for example, four) of second detection coils L2 that are connected in series (or parallel). Accordingly, various error factors can be avoided because each of the plurality of the first and second detection coils L1 and L2 are disposed on shaft surfaces. For example, temperature and material quality dispersions on shaft surfaces can be modified to be averaged. Gap fluctuations between the detection coils L1 and L2 and the shaft surfaces can also be modified to be averaged. As a result, a detection accuracy can be prevented from being deteriorated because of such error factors.

It is preferable that the plurality of the first and second detection coils L1 and L2 be lined up on the same circumference of the rotating shaft S (see FIGS. 9A, 9B, 10A and 10B). Various error factors can be avoided with the configuration. For example, temperature and material quality dispersions in a circumferential direction of shaft surfaces can be modified to be averaged. Fluctuations between the detection coils L1 and L2 and the shaft surfaces can also be modified to be averaged. Furthermore, a temperature gradient influence in an axial direction can be minimized. Accordingly, a detection accuracy deterioration because of such error factors can be avoided. In addition, an annular bobbin B holds the plurality of the first and second detection coils L1 and L2 at predetermined positions (see FIGS. 9A, 9B, 10A and 10B). The bobbin B may be an integral or split type.

A detection region of the first detection coil L1 may alternate with a detection region of the second detection coils L2 (see FIGS. 9A and 9B), the plurality of the first and second detection coils L1 and L2 being lined up on the same circumference of the rotating shaft S. By this configuration, an error that may be caused by misalignment between the detection regions of the first and second detection coils L1 and L2 can be reduced. Such error can also be prevented based on a rotating shaft S rotation.

A detection region of the first detection coil L1 may overlap with a detection region of the second detection coils L2 (see FIGS. 10A and 10B), the plurality of the first and second detection coils L1 and L2 being lined up on the same circumference of the rotating shaft S. For example, each height of the first and second detection coils L1 and L2 is set differently so as to be seen crossed with each other in a plan. Accordingly, an error that may be caused by misalignment between the detection regions of the first and second detection coils L1 and L2 can be prevented.

The invention claimed is:

1. A magnetostrictive torque sensor that detects a torque of a rotating shaft and/or a stationary shaft by using a magnetostriction inverse effect that occurs on a shaft surface, the magnetostrictive torque sensor comprising:
   a first detection coil that is disposed so as to detect a magnetic permeability change in a first direction on the shaft surface, the first detection coil detecting the magnetic permeability change in the first direction as an inductance change of the first detection coil;
   a second detection coil that is disposed so as to detect a magnetic permeability change in a second direction on the shaft surface, the second detection coil detecting the magnetic permeability change in the second direction as an inductance change of the second detection coil;
   a first oscillation circuit that oscillates autonomously at a predetermined reference frequency and causes phase shifts in oscillating waves according to the inductance change of the first detection coil;
   a second oscillation circuit that oscillates autonomously at a predetermined reference frequency and causes phase shifts in oscillating waves according to the inductance change of the second detection coil;
   a first direction magnetic permeability detector that performs an oscillating wave counting processing and detects the magnetic permeability change in the first direction based on a time required for the oscillating wave counting processing that counts a plurality of oscillating waves that are output from the first oscillation circuit and determines whether a counted number reaches a predetermined number N;
   a second direction magnetic permeability detector that performs an oscillating wave counting processing and detects the magnetic permeability change in the second direction based on a time required for the oscillating wave counting processing that counts a plurality of oscillating waves that are output from the second oscillation circuit and determines whether a counted number reaches a predetermined number N; and
   a torque detector that detects the torque of the rotating shaft and/or the stationary shaft based on a difference between the magnetic permeability of the first and second directions.

2. The magnetostrictive torque sensor according to claim 1, wherein the first and second detection coils form closed magnetic paths between the first and second detection coils and the shaft surface in order to limit detection regions and/or detection directions on the shaft surface.

3. The magnetostrictive torque sensor according to claim 2, wherein the first and second detection coils are formed using a high magnetic-permeability material, the first and second detection coils including:
   a core, the closed magnetic paths being between the core and the shaft surface; and
   a coil that is wound around the core.

4. The magnetostrictive torque sensor according to claim 1, wherein:
   the first oscillation circuit includes a plurality of first detection coils that are connected in series or parallel; and
   the second oscillation circuit includes a plurality of second detection coils that are connected in series or parallel.

5. The magnetostrictive torque sensor according to claim 4, wherein the plurality of first and second detection coils are lined up on a same circumference of the rotating shaft and/or the stationary shaft and disposed such that a detection region of the first detection coil alternates with a detection region of the second detection coil.

6. The magnetostrictive torque sensor according to claim 4, wherein the plurality of first and second detection coils are lined up on a same circumference of the rotating shaft and/or the stationary shaft and disposed such that a detection region of the first detection coil overlaps with a detection region of the second detection coil.

7. The magnetostrictive torque sensor according to claim 1, wherein the first and second oscillation circuits are driven alternately so as to avoid a mutual interference.

8. The magnetostrictive torque sensor according to claim 1, wherein a counting number changer is provided for changing the predetermined number N of the oscillating waves in one oscillating wave counting processing.

9. The magnetostrictive torque sensor according to claim 1, wherein the shaft surface includes a magnetostrictive film that is formed by plating.

10. A torque detection method for a magnetostrictive torque sensor that detects a torque of a rotating shaft and/or a stationary shaft using a magnetostriction inverse effect that occurs on a shaft surface, the magnetostrictive torque sensor including:
    a first detection coil that is disposed so as to detect a magnetic permeability change in a first direction on the shaft surface, the first detection coil detecting the magnetic permeability change in the first direction as an inductance change of the first detection coil;
    a second detection coil that is disposed so as to detect a magnetic permeability change in a second direction on the shaft surface, the second detection coil detecting the magnetic permeability change in the second direction as an inductance change of the second detection coil;
    a first oscillation circuit that oscillates autonomously at a predetermined reference frequency and causes phase shifts in oscillating waves according to the inductance change of the first detection coil; and
    a second oscillation circuit that oscillates autonomously at a predetermined reference frequency and causes phase shifts in oscillating waves according to the inductance change of the second detection coil,
    wherein the method includes the steps of:
    performing an oscillating wave counting processing and detecting the magnetic permeability change in the first direction based on a time required for the oscillating wave counting processing that counts a plurality of oscillating waves that are output from the first oscillation circuit and determines whether a counted number reaches a predetermined number N;
    performing an oscillating wave counting processing and detecting the magnetic permeability change in the second direction based on a time required for the oscillating wave counting processing that counts a plurality of oscillating waves that are output from the second oscillation circuit and determines whether a counted number reaches a predetermined number N; and
    detecting the torque of the rotating shaft and/or the stationary shaft based on a difference between the magnetic permeability of the first and second directions.

11. The torque detection method according to claim 10, wherein the first and second detection coils form closed magnetic paths between the first and second detection coils and the shaft surface in order to limit detection regions and/or detection directions on the shaft surface.

12. The torque detection method according to claim 11, wherein the first and second detection coils are formed using a high magnetic-permeability material, the first and second detection coils including:
  a core, the closed magnetic paths being between the core and the shaft surface; and
  a coil that is wound around the core.

13. The torque detection method according to claim 10, wherein:
  the first oscillation circuit includes a plurality of first detection coils that are connected in series or parallel; and
  the second oscillation circuit includes a plurality of second detection coils that are connected in series or parallel.

14. The torque detection method according to claim 13, wherein the plurality of first and second detection coils are lined up on a same circumference of the rotating shaft and/or the stationary shaft and disposed such that a detection region of the first detection coil alternates with a detection region of the second detection coil.

15. The torque detection method according to claim 13, wherein the plurality of first and second detection coils are lined up on a same circumference of the rotating shaft and/or the stationary shaft and disposed such that a detection region of the first detection coil overlaps with a detection region of the second detection coil.

16. The torque detection method according to claim 10, wherein the first and second oscillation circuits are driven alternately so as to avoid a mutual interference.

17. The torque detection method according to claim 10, wherein the predetermined number N of the oscillating waves in one oscillating wave counting processing is changed.

18. The torque detection method according to claim 10, wherein the shaft surface includes a magnetostrictive film that is formed by plating.

19. A magnetostrictive torque sensor that detects a torque of a rotating shaft and/or a stationary shaft by using a magnetostriction inverse effect that occurs on a shaft surface, the magnetostrictive torque sensor comprising:

a first detection coil that is disposed so as to detect a magnetic permeability change in a first direction on the shaft surface, the first detection coil detecting the magnetic permeability change in the first direction as an inductance change of the first detection coil;
  a second detection coil that is disposed so as to detect a magnetic permeability change in a second direction on the shaft surface, the second detection coil detecting the magnetic permeability change in the second direction as an inductance change of the second detection coil;
  a first oscillation circuit that oscillates autonomously at a predetermined reference frequency and causes phase shifts in oscillating waves according to the inductance change of the first detection coil;
  a second oscillation circuit that oscillates autonomously at a predetermined reference frequency and causes phase shifts in oscillating waves according to the inductance change of the second detection coil; and
  a controller that:
  performs an oscillating wave counting processing and detects the magnetic permeability change in the first direction based on a time required for the oscillating wave counting processing that counts a plurality of oscillating waves that are output from the first oscillation circuit and determines whether a counted number reaches a predetermined number N;
  performs an oscillating wave counting processing and detects the magnetic permeability change in the second direction based on a time required for the oscillating wave counting processing that counts a plurality of oscillating waves that are output from the second oscillation circuit and determines whether a counted number reaches a predetermined number N; and
  detects the torque of the rotating shaft and/or the stationary shaft based on a difference between the magnetic permeability of the first and second directions.

* * * * *